(12) United States Patent
Kim et al.

(10) Patent No.: US 11,794,664 B2
(45) Date of Patent: Oct. 24, 2023

(54) UNDERBODY CAMERA

(71) Applicant: Clarion Corporation of America, Cypress, CA (US)

(72) Inventors: Richard Kim, Rochester Hills, MI (US); Sundara Gopalakrishnan, Windsor (CA); Peter Burke, Waterford, MI (US); Ajinkya Patil, Maharashtra (IN)

(73) Assignee: Clarion Corporation of America, Auburn Hills, MI (US)

( * ) Notice: Subject to any disclaimer, the term of this patent is extended or adjusted under 35 U.S.C. 154(b) by 119 days.

(21) Appl. No.: 17/386,599

(22) Filed: Jul. 28, 2021

(65) Prior Publication Data
US 2023/0034133 A1 Feb. 2, 2023

(51) Int. Cl.
*B60R 11/04* (2006.01)
*H04N 23/51* (2023.01)
*B60R 11/00* (2006.01)

(52) U.S. Cl.
CPC ............ *B60R 11/04* (2013.01); *H04N 23/51* (2023.01); *B60R 2011/0029* (2013.01); *B60R 2011/0063* (2013.01)

(58) Field of Classification Search
None
See application file for complete search history.

(56) References Cited

U.S. PATENT DOCUMENTS

| | | | |
|---|---|---|---|
| 9,452,739 B2 | 9/2016 | Kikuta | |
| 10,576,906 B2* | 3/2020 | Nickel | H04N 23/50 |
| 10,638,024 B1* | 4/2020 | Dresang | H04N 23/52 |
| 10,694,153 B2* | 6/2020 | Hendricks | H04N 7/183 |
| 10,703,300 B2 | 7/2020 | Koseki | |
| 11,178,322 B2* | 11/2021 | Park | H04N 23/55 |
| 11,554,737 B2* | 1/2023 | Church | G08G 1/167 |
| 2010/0040361 A1* | 2/2010 | Schuetz | E05B 81/76 396/428 |
| 2011/0199485 A1* | 8/2011 | Nakamura | G02B 13/001 348/148 |
| 2017/0050581 A1* | 2/2017 | Buss | H04N 23/55 |
| 2018/0001837 A1* | 1/2018 | Trebouet | B60S 1/528 |
| 2018/0126921 A1* | 5/2018 | Koseki | B08B 5/02 |
| 2018/0319350 A1 | 11/2018 | Ji | |
| 2018/0345917 A1* | 12/2018 | Yamamoto | B60R 11/04 |

(Continued)

FOREIGN PATENT DOCUMENTS

EP 3362318 A1 8/2018
WO 2017063440 4/2017
(Continued)

OTHER PUBLICATIONS

Extended European Search Report for European App. No. EP22185287.4 (dated Jan. 16, 2023), IDFAUH21011 EP, 6 pages.

*Primary Examiner* — Rodney E Fuller
(74) *Attorney, Agent, or Firm* — BARNES & THORNBURG LLP

(57) ABSTRACT

An underbody camera located beneath and within a wheel base of a vehicle includes a mounting bracket coupled to the vehicle, a camera housing, and a camera. The camera housing is coupled to the mounting bracket and defines an interior camera compartment. The camera is coupled to the camera housing and is arranged to lie within the interior camera compartment.

20 Claims, 7 Drawing Sheets

(56) References Cited

U.S. PATENT DOCUMENTS

| | | | |
|---|---|---|---|
| 2019/0135216 A1 | 5/2019 | Church | |
| 2020/0124944 A1* | 4/2020 | Ju | G03B 17/08 |
| 2021/0191235 A1* | 6/2021 | Nakamura | H04N 23/55 |
| 2021/0272432 A1* | 9/2021 | Omata | G08G 1/04 |

FOREIGN PATENT DOCUMENTS

| | | |
|---|---|---|
| WO | 2020207860 | 10/2020 |
| WO | 2020233878 | 11/2020 |

\* cited by examiner

UNDERBODY CAMERA

BACKGROUND

The present disclosure relates to a camera, and particularly to a camera for a vehicle. More particularly, the present disclosure relates to a camera configured to attach to a frame of the vehicle to view objects beneath the vehicle.

SUMMARY

According to the present disclosure, a vehicle includes a vehicle body, a vehicle frame, and a plurality of wheels. The vehicle body defines the cabin of the vehicle and supports one or more occupants and an operator for transport by the vehicle. The vehicle frame is configured to support the vehicle body. The plurality of wheels are coupled to the vehicle frame and support the vehicle body and the vehicle frame above ground to allow the vehicle to travel over the ground.

In illustrative embodiments, an underbody camera is adapted to be coupled to the vehicle to view obstacles under and around the vehicle that are not visible to the operator. The underbody camera is located beneath the vehicle body of the vehicle and is arranged to lie within a wheel base of the vehicle. The underbody camera may be coupled to one or more vehicle sub-systems such as an electronic control unit (ECU) of the vehicle, a fluid source or reservoir, and/or an air source to provide an underbody camera system for the vehicle.

In illustrative embodiments, the underbody camera is coupled to at least one of the vehicle body and the vehicle frame and includes a mounting bracket, a camera housing, and a camera. The mounting bracket mounts the underbody camera to the vehicle. The camera housing is coupled to the mounting bracket. The camera is coupled to the camera housing and is contained within an interior camera compartment defined by the camera housing and the camera mount. The camera may be serviced due to the arrangement of the components included in the camera housing and the mounting bracket.

In illustrative embodiments, the camera housing is configured to protect the camera from debris, weather, and corrosion/deterioration. The camera housing includes an outer camera shell, a camera mount configured to couple to the outer camera shell, and a protective lens. The outer camera shell, the camera mount, and the protective lens cooperate to define the interior camera compartment that contains and protects the camera. The outer camera shell is coupled to the mounting bracket at least partially extends through a rear opening of the outer camera shell toward the protective lens. The protective lens arranged to lie between the outer camera shell and the camera mount and covers a front opening of the outer camera shell opposite the rear opening. The camera is arranged to lie within the interior camera compartment between the protective lens and the camera mount. The camera housing may be disassembled to remove and replace various components of the underbody camera such as the camera or the front protective lens.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a side elevation view of a vehicle including a vehicle body, a vehicle frame and a plurality of wheels and showing an underbody camera, in accordance with the present disclosure, coupled to the vehicle and arranged to lie beneath the vehicle frame and within a wheel base to observe one or more obstructions relative to the wheels of the vehicle so that an operator of the vehicle can maneuver the vehicle to avoid the obstructions;

FIG. 2 is a perspective and diagrammatic view of the underbody camera from FIG. 1 showing that the underbody camera includes a mounting bracket, a camera housing coupled to the mounting bracket, a camera located within an internal camera compartment formed by the outer camera shell and connected to an electronic control system, and showing the underbody camera coupled to one or more sub-systems of the vehicle to provide an underbody camera system for the vehicle;

Figure 8:
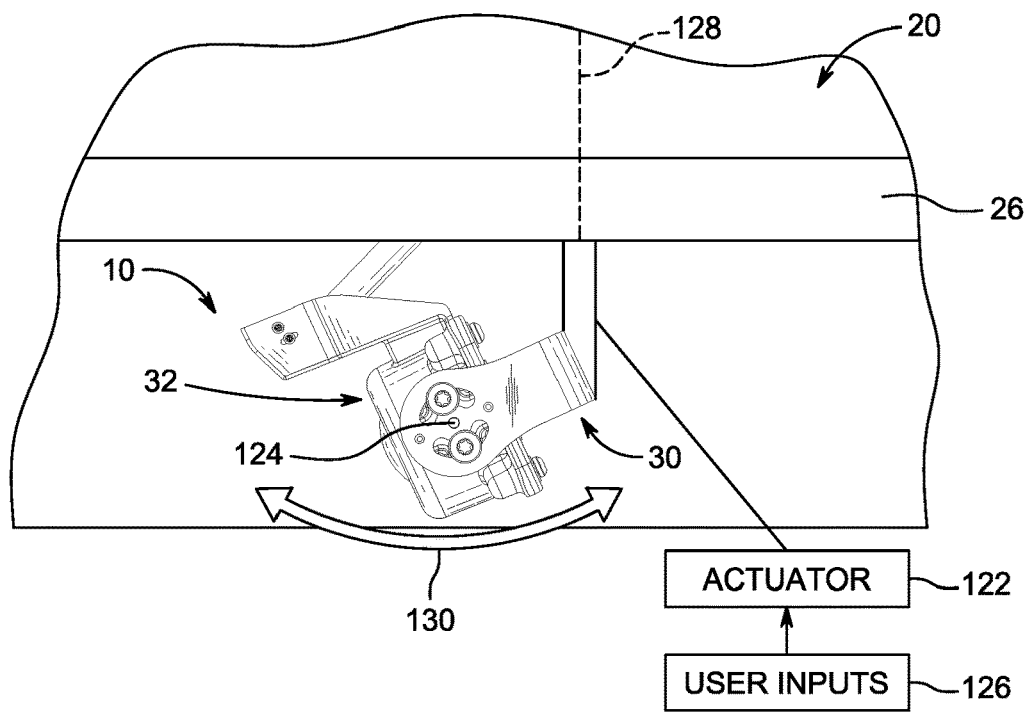
Figure 9:
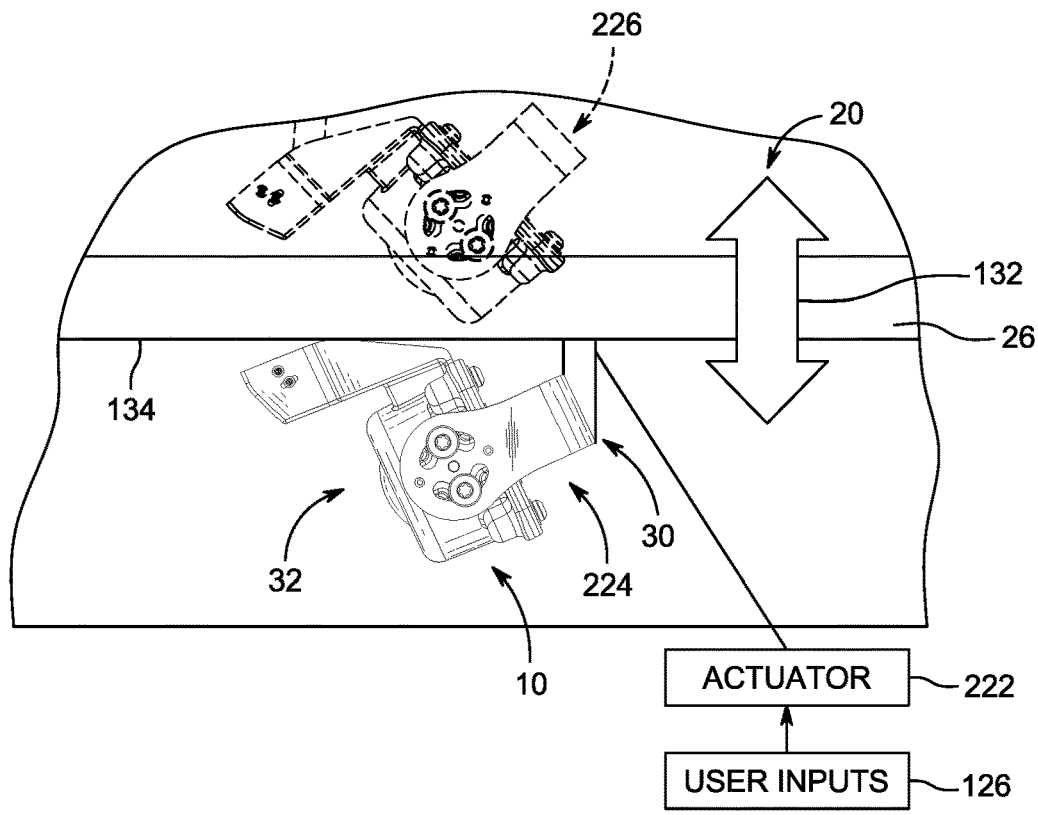
Figure 10:
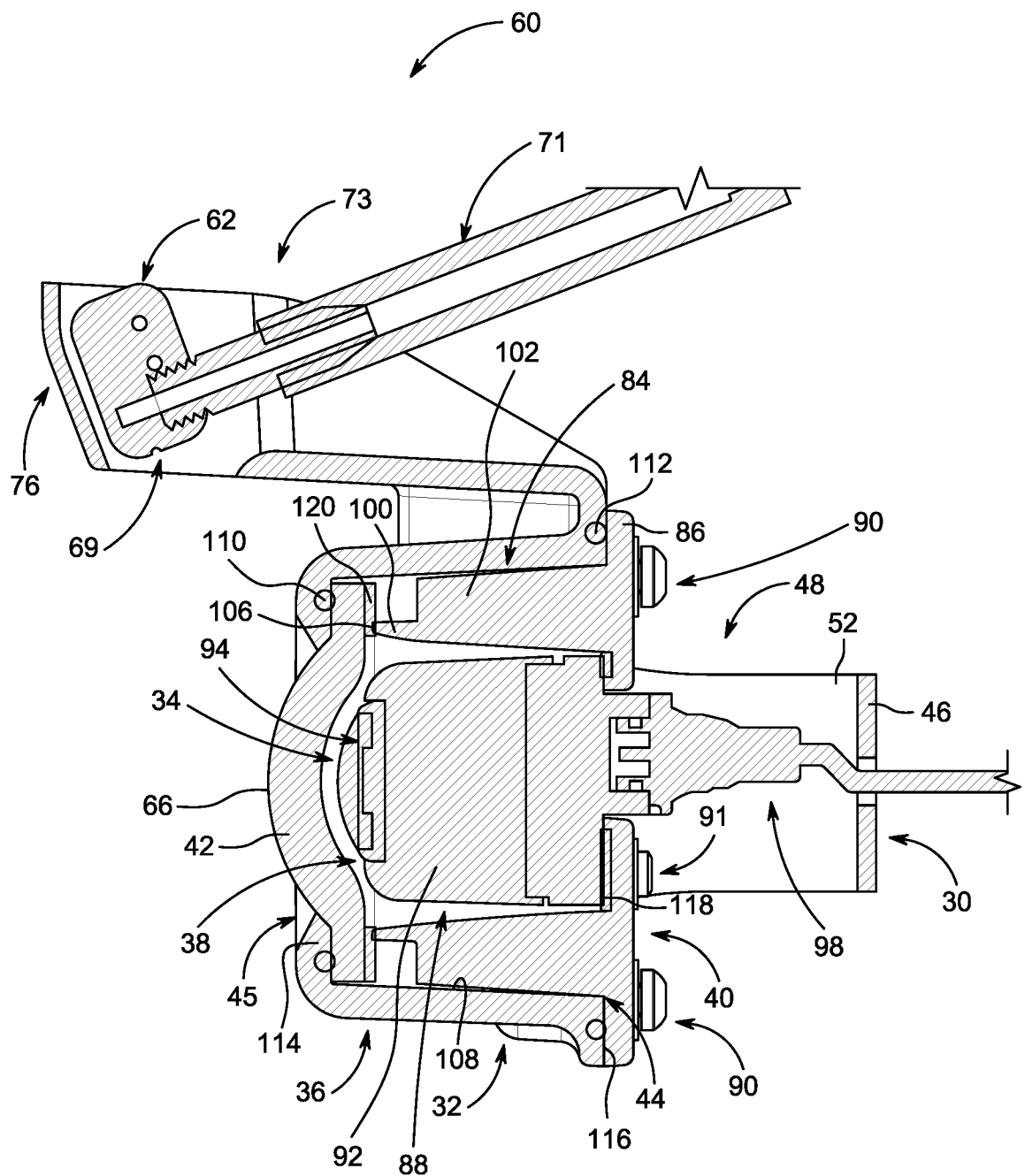

FIG. 8 is a side elevation and diagrammatic view of a portion of the vehicle showing that the underbody camera may further include an actuator configured to receive user inputs to adjust a viewing angle of the underbody camera between a forward-looking orientation and a rearward-looking orientation and to adjust the viewing angle about a vertical pivot axis between left and right sides of the vehicle;

FIG. 9 is a side elevation and diagrammatic view similar to FIG. 8 showing that the under body camera may be moved between a retracted position in which the underbody camera is hidden and protected by portions of the vehicle and an extended position in which the underbody camera is deployed to view obstructions under and around the vehicle; and FIG. 10 is a cross sectional view of another embodiment of an underbody camera including a lens cleaning system having a common conduit configured to carry a fluid source and an air source to a spray nozzle for discharge onto a lens of the camera to clean the lens of debris.

DETAILED DESCRIPTION

Figure 1:
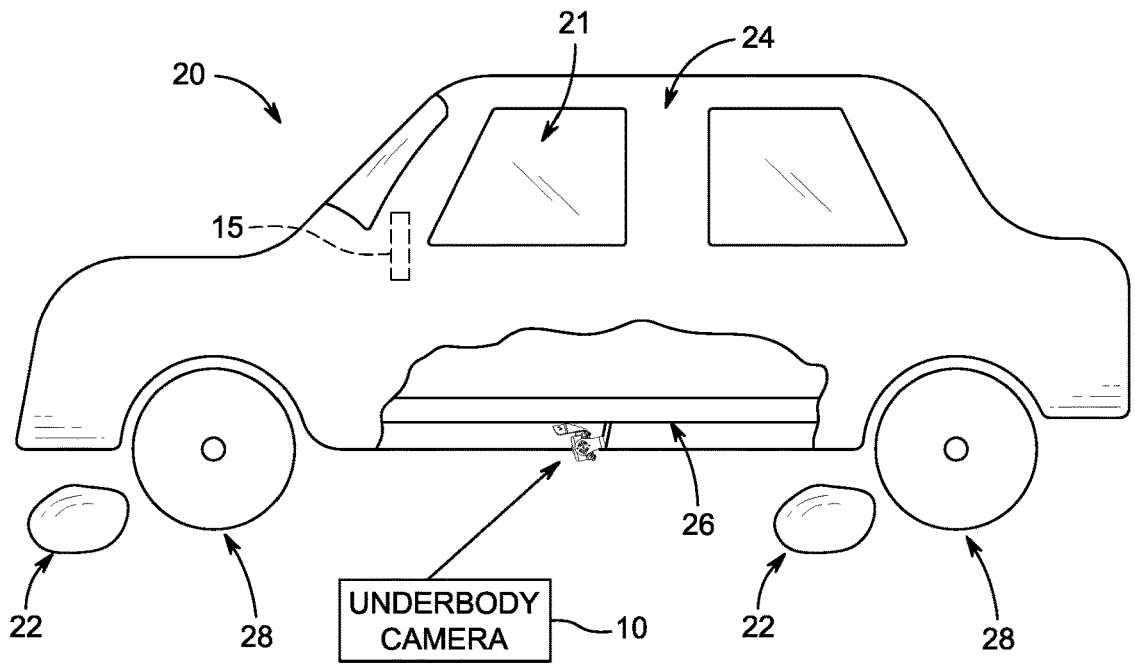
Figure 2:
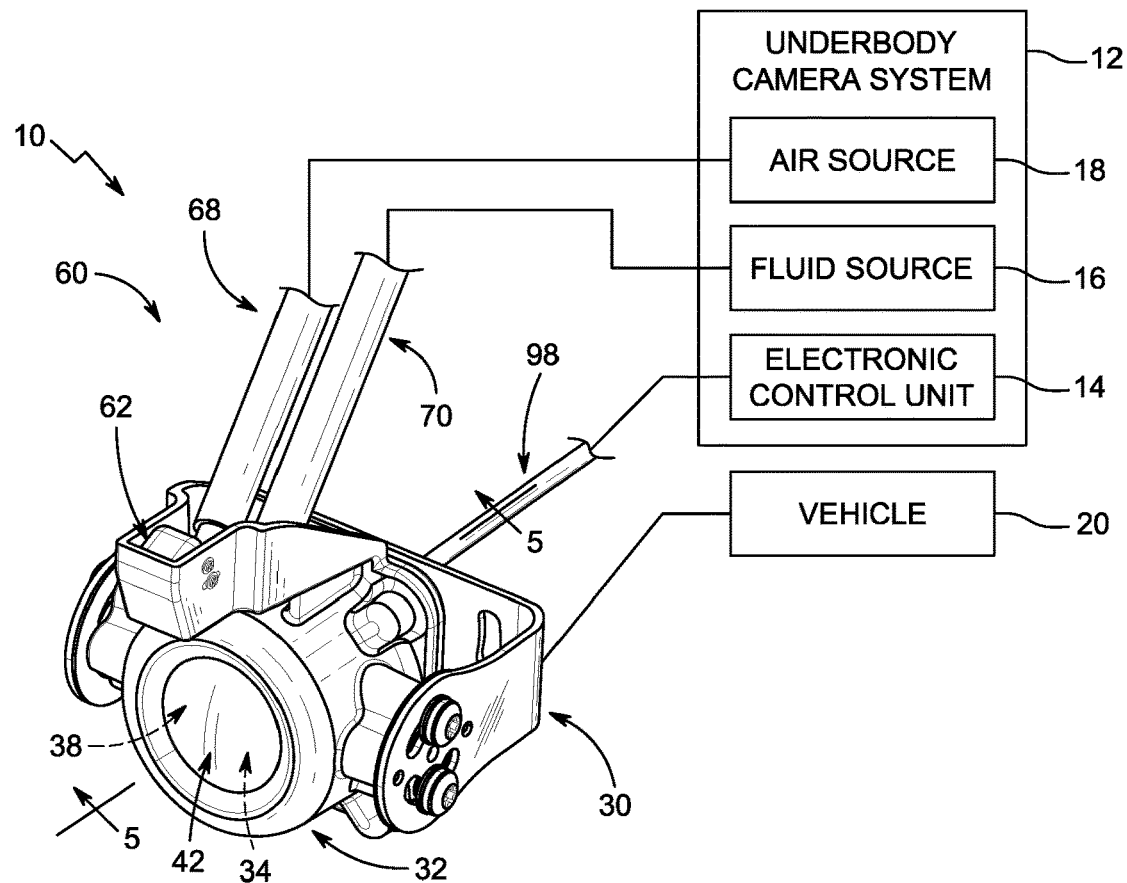

An underbody camera 10 in accordance with the present disclosure is adapted to be coupled to a vehicle 20 to view obstacles 22 under and around the vehicle 20 and not visible to an operator of the vehicle 20 as shown in FIG. 1. The underbody camera 10 is located beneath a vehicle body 24 of the vehicle 20 and is arranged to lie within a wheel base of the vehicle 20. The underbody camera 10 may be coupled to one or more vehicle sub-systems to provide an underbody camera system 12 including the underbody camera 10 as shown in FIG. 2.

The underbody camera system 12 may further include an electronic control unit (ECU) 14, a fluid source or reservoir 16, and/or an air source 18, each of which is included in the vehicle 20. The ECU 14 receives electronic signals and data from the underbody camera 10 and is configured to display images captured by the underbody camera 10 on a screen 15 located in a cabin 21 of the vehicle 20, for example. The fluid source 16 and air source 18 are used by the underbody camera 10 to provide a lens-cleaning system 60 to clean portions of the underbody camera 10 so that the images captured and displayed on the screen 15 are clear for the operator of the vehicle 20.

The vehicle 20 may be any land vehicle having portions that are not visible to the operator within the cabin 21 such as an underbody of the vehicle 20. The vehicle 20 includes a vehicle body 24, a vehicle frame 26, and a plurality of wheels 28. The vehicle body 24 defines the cabin 21 of the vehicle 20 and supports one or more occupants and the operator for transport by the vehicle 20. The vehicle frame 26 includes structural components of the vehicle 20 such as a vehicle chassis, for example, and is configured to support the vehicle body 24. The plurality of wheels 28 are coupled to the vehicle frame 26 and support the vehicle body 24 and the vehicle frame 26 above ground to allow the vehicle 20 to travel over the ground.

The ground that the vehicle 20 travels over may include obstacles 22, such as rocks, which could damage portions of the vehicle 20 if the operator fails to avoid the obstacles 22. In some instances, the obstacles 22 are located in areas relative to the vehicle 20 not visible to the operator as shown in FIG. 1. The underbody camera 10 is configured to capture images of areas not visible to the operator (i.e. around wheels 28) to aid the operator in maneuvering the vehicle 20 to avoid the obstacles 22.

The underbody camera 10 is coupled to at least one of the vehicle body 24 and the vehicle frame 26 and includes a mounting bracket 30, a camera housing 32, and a camera 34 as shown in FIGS. 1 and 2. The mounting bracket 30 mounts the underbody camera 10 to the vehicle 20. Illustratively, the underbody camera 10 is retained to the vehicle frame 26 and has a view area toward the front wheels 28 of the vehicle 20. In some embodiments, the underbody camera 10 view area may be directed toward the rear wheels 28 or may be adjustable to any and all orientations relative to the vehicle 20 as suggested in FIGS. 8 and 9. The camera housing 32 is coupled to the mounting bracket 30. The camera 34 is coupled to the camera housing 32 and is contained within an interior camera compartment 38. As will be explained, the camera 34 is easily serviceable due to the arrangement of the components included in the camera housing 32 and the mounting bracket 30.

Figure 5:
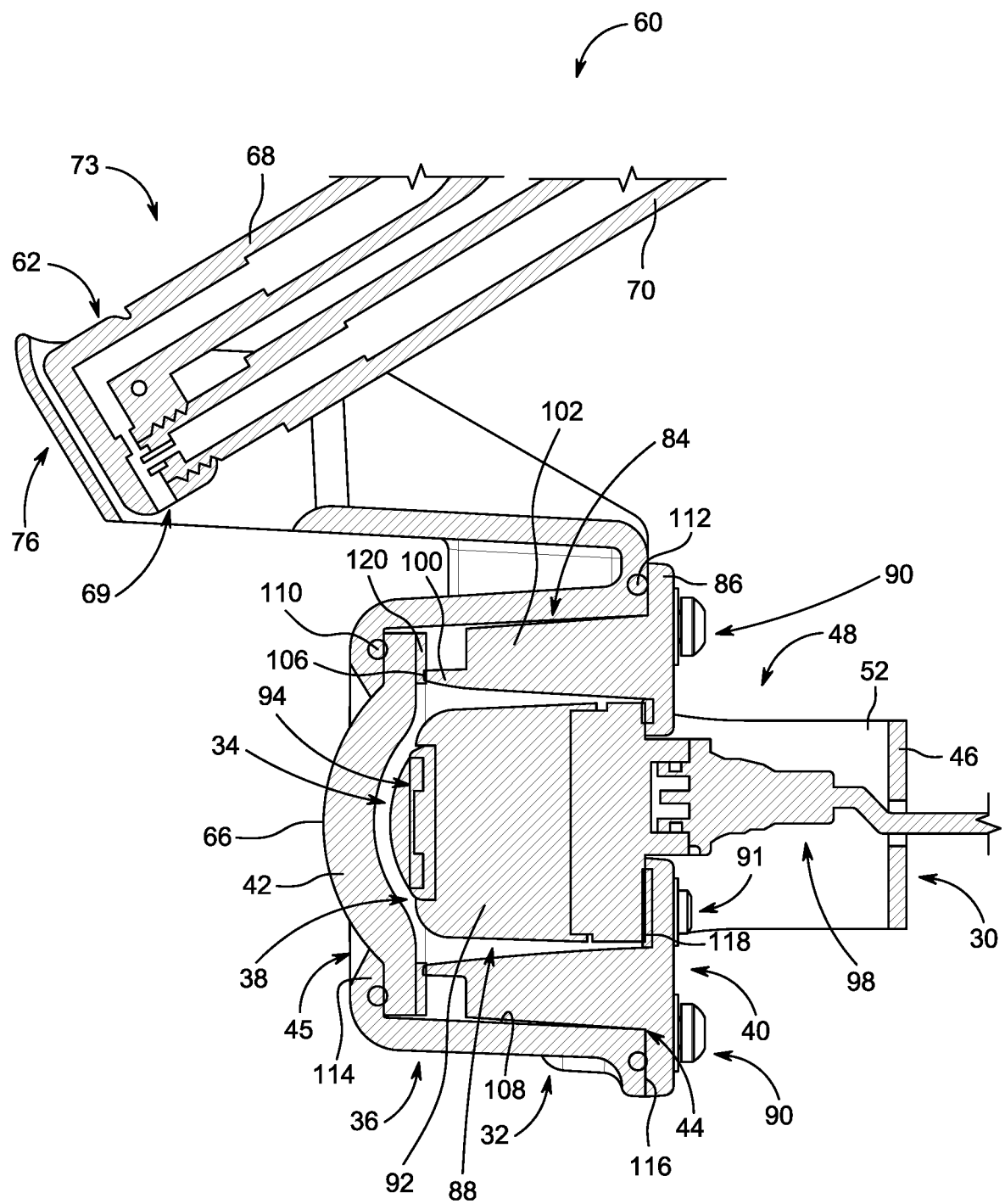
FIG. 5 is a cross-sectional view of the underbody camera taken along line 5-5 in FIG. 2 showing the camera contained within the internal camera compartment and the lens cleaning system including a spray nozzle configured to direct a stream of at least one of cleaning fluid and pressurized air onto the protective lens.
Figure 6:
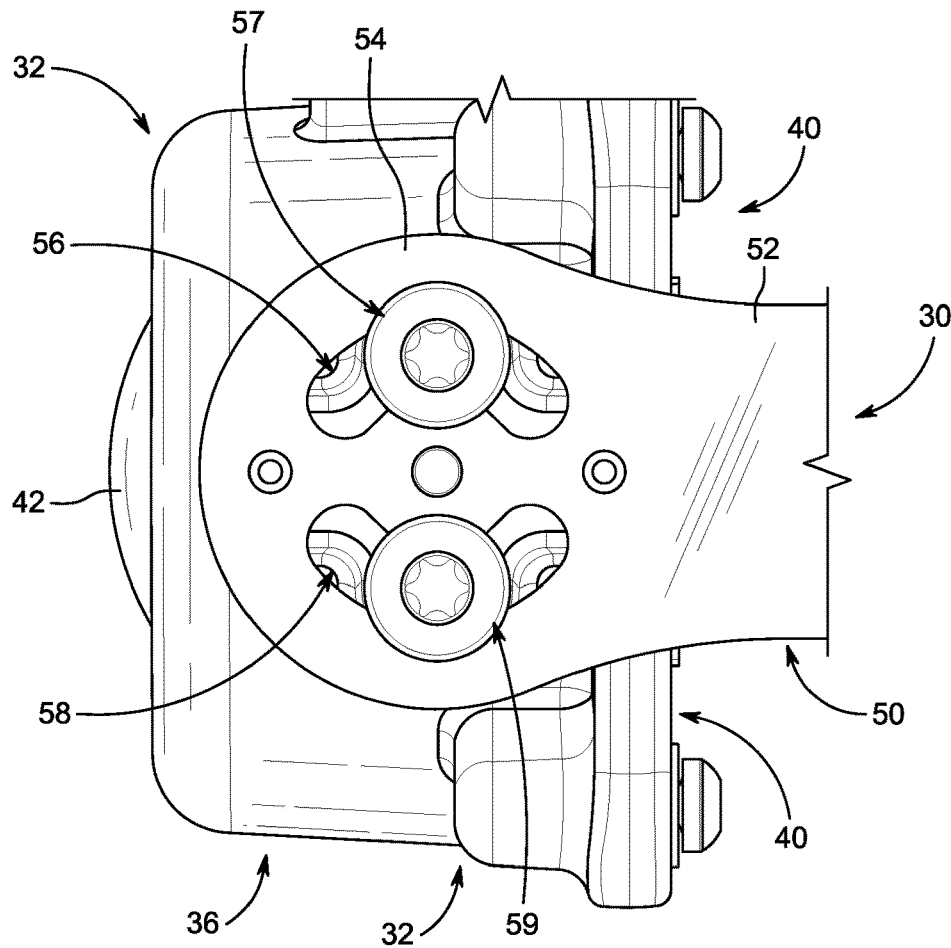
FIG. 6 is an enlarged view of a portion of the underbody camera from FIG. 4 showing that the mounting bracket is formed to include a pair of curved slots to adjustably mount the camera housing to the vehicle for pivotable movement about a camera pivot axis.

The camera housing 32 is configured to protect the camera 34 from debris, weather, and corrosion/deterioration as shown in FIGS. 2 and 5. The camera housing 32 includes an outer camera shell 36, a camera mount 40 configured to couple to the outer camera shell 36, and a protective lens 42. The outer camera shell 36, the camera mount 40, and the protective lens cooperate to define the interior camera compartment 38 that contains and protects the camera 34. The outer camera shell 36 is coupled to the mounting bracket 30 at least partially extends through a rear opening 44 of the outer camera shell 36 toward the protective lens 42. The protective lens 42 arranged to lie between the outer camera shell 36 and the camera mount 40 and covers a front opening 45 of the outer camera shell 36 opposite the rear opening 44. The camera 34 is arranged to lie within the interior camera compartment 38 between the protective lens 42 and the camera mount 40.

Figure 3:
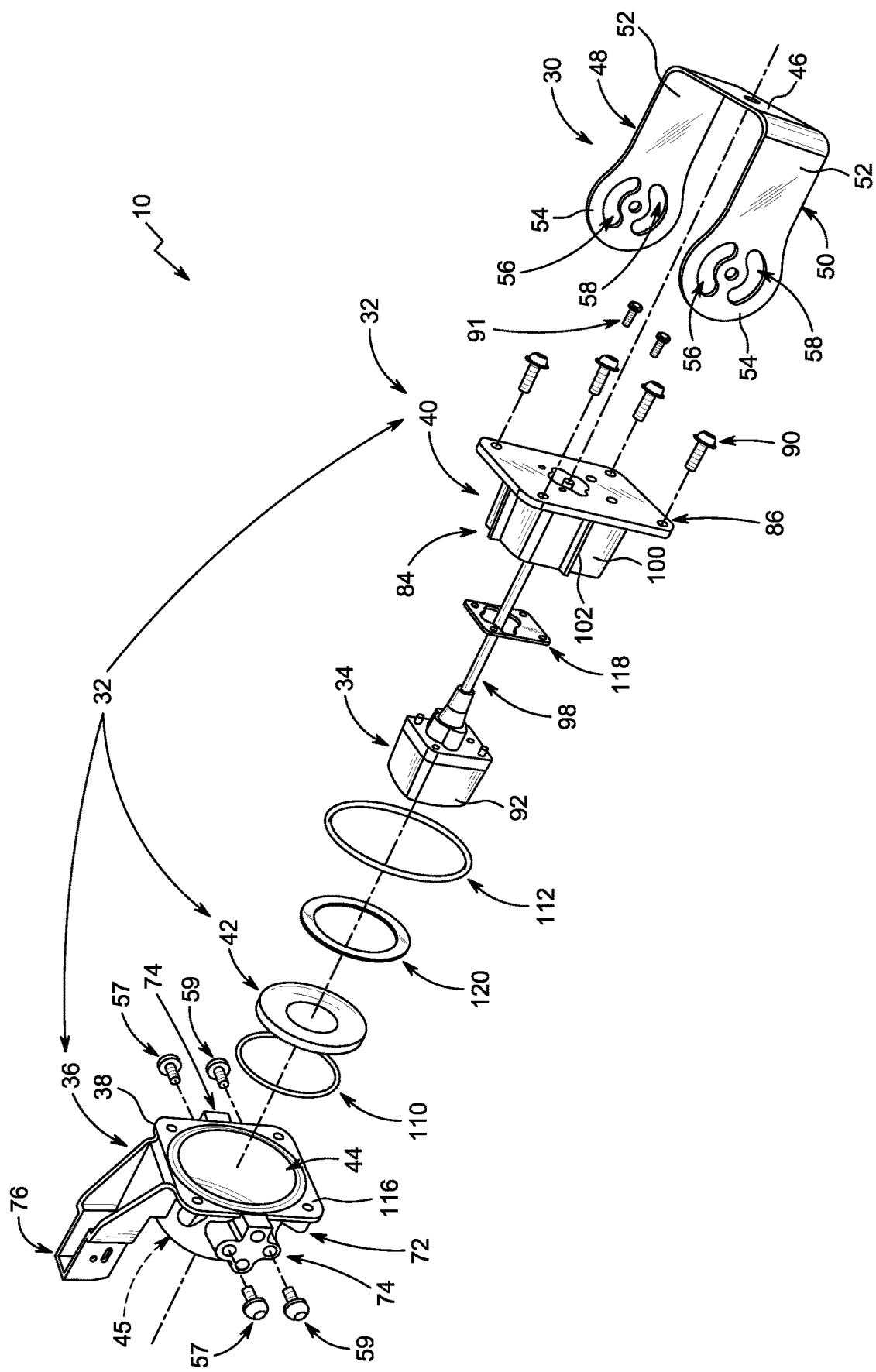
FIG. 3 is an exploded assembly view of the underbody camera showing, from left to right, that the underbody camera includes a camera shell, a front camera-shell seal, a protective lens, a lens felt gasket, a rear camera-shell seal, the camera, a camera gasket, a camera mount, a plurality of fasteners, and the mounting bracket.
Figure 4:
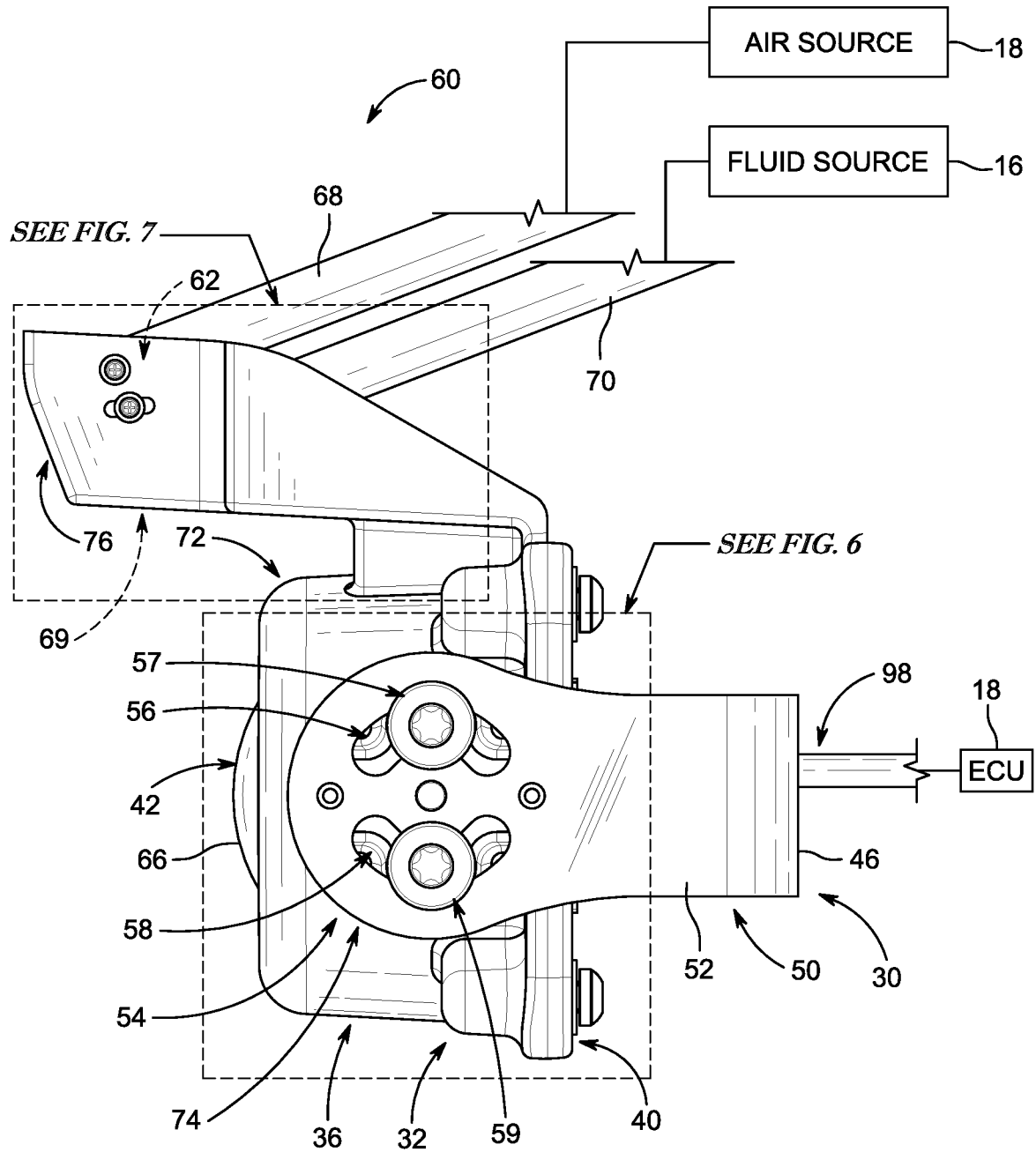
FIG. 4 is a side elevation view of the underbody camera fully assembled with dashed lines indicating enlarged views shown in FIGS. 6 and 7.

The mounting bracket includes a base 46, a first mount arm 48 extending outwardly from the base 46 and a second mount arm 50 extending outwardly from the base as shown in FIGS. 3 and 4. The first mount arm 48 is spaced apart from the second mount arm 50 such that the first mount arm 48 is configured to engage a first lateral side of the camera housing 32 and the second mount arm 50 is configured to engage a second lateral side of the camera housing 32.

The first mount arm 48 and the second mount arm 50 each include an arm extension 52 coupled to the base 46 and an arm head 54 coupled to a distal end of the arm extension 52 spaced apart from the base 46. The arm head 54 is formed to include a pair of curved openings 56, 58 each configured to receive a fastener 57, 59 to mount the camera housing 32 to the mounting bracket 30. Each fastener 57, 59 is moveable through each corresponding slot 56, 58 to adjust an orientation of the camera housing 32 relative to the mounting bracket 30 such that a viewing angle of the camera 34 relative to the vehicle 20 may be adjusted. The pair of curved slots 56, 58 that are symmetrical relative to one another about a longitudinal axis of each corresponding mount arm 48, 50.

The underbody camera 10 further comprises a lens-cleaning system 60 configured to clean an outer surface of the protective lens 42 so that the image data captured by the camera 34 is clear. The lens-cleaning system 60 includes a spray nozzle 62 mounted on the camera housing 32 and arranged to direct a cleaning fluid toward an outer surface 66 of the protective lens 42, and a cleaning-fluid conduit 70 arranged to extend from the fluid source 16 toward the spray nozzle 62 to deliver the cleaning fluid to the spray nozzle 62. The lens-cleaning system 60 may further include a second cleaning fluid conduit 68 configured to supply a second cleaning fluid from the air source 18. The second cleaning fluid provided by the air source 18 is different from the cleaning fluid provided by the fluid source 16. In one example, the cleaning fluid from the fluid source 16 is a liquid and the second cleaning fluid from the air source 18 is a gas. In one embodiment the fluid source 16 is a windshield-wiper fluid reservoir and the air source 18 is a pneumatic pump, such as a pneumatic pump used to inflate and deflate bladders in a vehicle seat of the vehicle 20.

The first cleaning fluid is configured to wash the outer surface 66 of the protective lens 42 while the second cleaning fluid pressurizes the first cleaning fluid exiting the spray nozzle 62. The first cleaning fluid may be shut off while the second clean fluid continues to impact the protective lens 42 to dry the protective lens 42.

The fluid conduits 68, 70 are separate from one another until they reach the spray nozzle 62 as shown in FIG. 5. The fluid conduit 68 coupled to the air source 18 is arranged to lie above the fluid conduit 70 coupled to the fluid source 16. After reaching the spray nozzle 62, pressurized air is directed downwardly toward the second cleaning fluid conduit 70 and an exit aperture 69 of both fluid conduits 68, 70. Both cleaning fluids exit the spray nozzle 62 from the exit aperture 69 in the form of a pressurized mist to clean the lens 42. The spray nozzle 62 includes one or more release or check valves to control release of one or both of the fluids from the exit aperture 69 at a time. The valves may be electrically, mechanically, or pneumatically operated. In another embodiment, the fluid conduits may join and form or be bundled in a common conduit 71 as shown in FIG. 10.

The spray nozzle 62 is coupled to the outer camera shell 36 for movement therewith and relative thereto. The outer camera shell 36 includes a outer-shell body 72, a pair of shell-mount foundations 74, and a nozzle shield 76 coupled to the outer-shell body 72. The outer-shell body 72 at least partially defines the interior camera compartment 38. The shell-mount foundations 74 are configured to engage the mounting bracket 30 to secure the camera 34 to the vehicle 20. The nozzle shield 76 is arranged to extend upwardly away from the outer-shell body and is arranged to lie in front of the spray nozzle 62 to block debris from reaching the spray nozzle 62.

Figure 7:
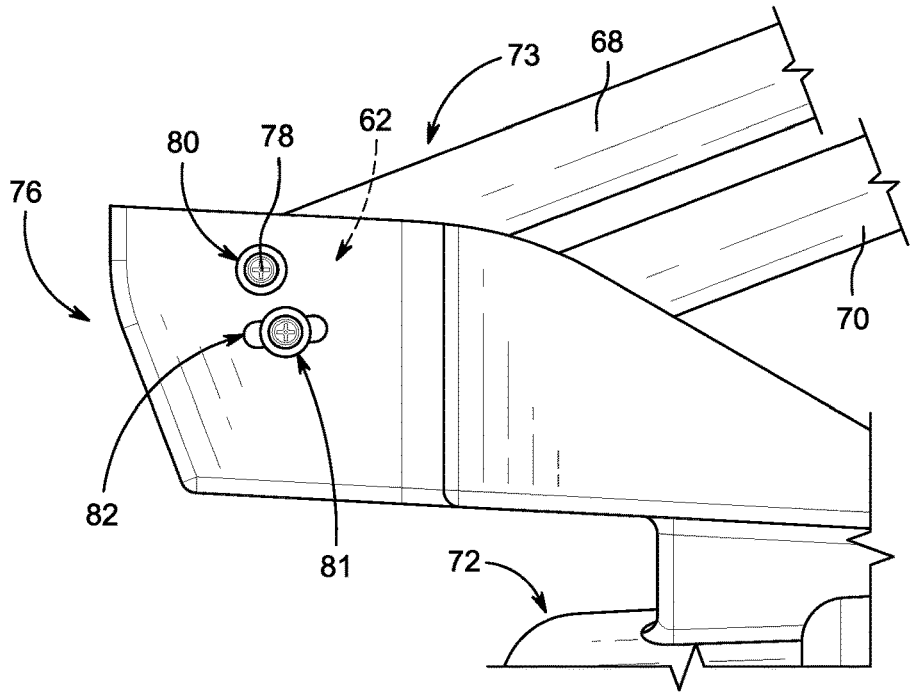
FIG. 7 is an enlarged view of a portion of the underbody camera from FIG. 4 showing the spray nozzle mounted to a portion of the camera housing for pivotable movement about a spray-nozzle pivot axis to adjust a spray orientation relative to the protective lens.

The spray nozzle 62 is mounted to an extension 73 of the outer-shell body 72 for pivotable movement about a spray-nozzle pivot axis 78 as shown in FIG. 7. The spray nozzle 62 is coupled to the extension 73 of the outer-shell body 72 by a pair of fasteners 80, 81. One of the fasteners 80 is fixed in position relative to the extension 73 while the other of the fasteners 81 is received in a slot 82 formed in the extension 73. Fastener 81 is movable within slot 82 to adjust an angle of the spray nozzle 62 relative to the protective lens 42 and to adjust a spray location of the cleaning fluids onto the protective lens 42.

The camera mount 40 includes an inner camera shell 84 arranged to at least partially extend through the rear opening 44 of the outer camera shell 36 and an attachment plate 86 configured to engage the outer camera shell 36 and cover the rear opening 44 as shown in FIGS. 4 and 5. The inner camera shell defines a camera-receiving pocket 88 arranged within the interior camera compartment 38. The camera 34 is arranged to lie within the camera-receiving pocket 88 to provide dual-layer protection for the camera 34 with the outer camera shell 36 and the inner camera shell 84.

The inner camera shell 84 includes an inner-shell body 100 and a plurality of spacer ribs 102 coupled to an outer surface of the inner-shell body 100 as shown in FIGS. 3 and 5. A distal end 104 of the inner-shell body 100 is spaced apart from the attachment plate 86 and urges the protective lens 42 toward the front opening 45 formed in the outer camera shell 36 to close the front opening 45. Each of the spacer ribs 102 is configured to engage an inside surface 108 of the outer camera shell 36 to position the camera 34 relative to the protective lens 42. The inner camera shell 84 is attached to the outer camera shell 36 by a plurality of fasteners 90 that pull the attachment plate 86 toward a rear end 116 of the outer camera shell 36 and the distal end 104 of the inner-shell body 100 toward the front protective lens 42.

The camera 34 is fixed to the attachment plate 86 by at least one fastener 91 that extends through the attachment plate 86 toward the protective lens 42 to couple the camera 34 to the attachment plate 86. The camera 34 includes a camera head 92 that captures image data and a camera lens 94 coupled to the camera head 92. The camera lens 94 is configured to cooperate with the protective lens 42 to focus the image data. The camera 34 further includes a connector 98 that extends between the camera head 92 and the ECU 14 to transmit the image data over a wired connection. In other embodiments, the camera head 92 may include one or more transceivers and/or antennas to transmit the image data over a wireless connection to the ECU 14.

The camera housing 32 may further include a plurality of weather-resistant or weather-proofing components to block debris, elements, and moisture from entering the interior camera compartment 38 as shown in FIGS. 3 and 5. The camera housing 32 further includes a first ring seal 110 and a second ring seal 112. The first ring seal 110 is positioned between an annular rim 114 of the outer camera shell 36 defining the front opening 45 and the protective lens 42. The second ring seal 112 is positioned between a rear end 116 of the outer camera shell 36 and the attachment plate 86.

The camera housing 32 may further include a plurality of protective gaskets to block damage of the underbody camera 10 due to contact between various components of the underbody camera 10 when fully assembled. The camera housing 32 further includes a camera-head gasket 118 and a protective lens gasket 120. The camera-head gasket 118 is positioned between the attachment plate 86 and the camera head 92. The protective lens gasket 120 is positioned between the protective lens 42 and the distal tip 106 of the inner-shell body 100.

The arrangement of all of the components of the underbody camera 10 allows the camera 34 or other components such as lens 42 to be serviced. Starting from a fully assembled underbody camera 10, the camera 34 may be serviced by removing or unplugging the camera connector 98 from the camera head 92. The camera housing 32 can then be removed from the cleaning system 60 and the mounting bracket 30 by removing fasteners 57, 59, 80, 81. At this point the camera housing 32 and the camera 34 are separated from the vehicle 20 and may be removed from under the vehicle 20. The camera mount 40 may then be separated from the outer camera shell 36 by removing fastener(s) 90. At this point the camera mount 40 and the camera 34 can be separated from the outer camera shell and the protective lens 42 in a rearward direction thereby removing the camera 34 from the interior camera compartment 38. The camera 34 may then be separated from the camera mount 40 by removing fastener(s) 91. If the camera 34 is damaged, a new camera can replace the damaged camera 34. The protective lens 42 may also be removed from the outer camera shell 36 if it is damaged, for example.

To reassemble the underbody camera 10, the protective lens 42 (for example a new lens 42) is first inserted into the outer camera shell 36 with first ring seal 110 in place. The camera 34 (for example a new camera 34) is then attached to the camera mount using fastener(s) 91. The camera mount 40 and the camera 34 may then be attached to outer camera shell with fastener(s) 90 with second ring seal 112 in place. The camera housing 32 and the camera 34 may then be attached to mounting bracket 30 by fasteners 57, 59. The title angle of the camera housing 32 may be adjusted. The spray nozzle 62 and the connector 98 may then be re-installed.

In some embodiments, the underbody camera 10 or portions thereof are adjustable relative to the vehicle 20 by user inputs 126 that cause the underbody camera 10 to adjust its orientation relative to the vehicle 20 as shown in FIGS. 8 and 9. In one example, the user inputs 126 are input into screen 15 in cabin 21 of vehicle 20 to cause the actuator 122 to move the underbody camera 10. The user inputs 126 may be transferred from the screen 15 to the underbody camera via ECU 14. Accordingly, the ECU 14 includes one or more microprocessors and memory storage devices storing instructions that, when executed by a microprocessor, cause the actuator 122 to move the underbody camera according to set movement paths 130, 132 based on the user inputs 126.

The underbody camera 10 may further include an actuator 122 configured to pivot the camera housing 32 and the camera 34 relative to the mounting bracket 30 about a pivot axis 124 such that the camera 34 captures image data of a front and a rear of the vehicle 20. The actuator 122 may also move the mounting bracket 30. In some embodiments, the actuator 122 may be configured to pivot the mounting bracket 30, the camera housing 32, and the camera 34 about a vertical axis 128 relative to the vehicle 20 to view a front or a rear of the vehicle 20.

The underbody camera 10 may further include a second actuator 222 configured to move the mounting bracket 30, the camera housing 32, and the camera 34 from an extended position 224 to a retracted position 226. In the extended position, the camera 10 is deployed to capture image data of areas under and around the vehicle 20. In the retracted position, the camera housing 32 and the camera 34 are moved upwardly closer to the vehicle body 24. The camera housing 32 and the camera 34 may be positioned above a lowermost edge 134 of the vehicle frame 26 in the retracted position.

In some embodiments, operators can encounter an irregular driving road and can have unknown surprises on the road. To avoid that and enable drivers to view things present under the vehicle body, this underbody camera 10 of the present disclosure is provided. The underbody camera system 10 shall allow customers (driver) to have a real-time view of terrain under the vehicle relative to wheels 28 and underbody 26 and to accurately judge depth and scale of obstacles in the targeted views.

The present disclosure allows for the camera 34 to be serviced. The design of the outer casing 32 for the camera 34 and mounting method 30 helps the user with easy camera 34 serviceability. The camera housing 32 includes a one direction stacked up design so that the camera 34 and the protective lens 42 are installed from the rear so that the camera 34 can be serviced by removal of the camera mount 40 from the outer camera shell 36.

In some embodiments, the field of view of the underbody camera 10 is about 120 degrees. The camera 34 may have a resolution of 1280×800 pixels and a frame rate of 30 frames per second, but other resolutions and frame rates are also possible. In some embodiments the horizontal field of view is about 217 degrees and the vertical field of view is about 138.8 degrees. In other embodiments, the field of view may be larger or smaller.

In some embodiments, the system 10 includes a nozzle 62 for self-cleaning of the camera lens cover 42. The nozzle 62 is placed in such an angle that fluid jet from the nozzle 62 can clean the entire lens 42 area. The lens cover (front lens) 42 may be coated with a ballistic coating which can improve the protection of the camera lens. In some embodiments, the system 10 is water-proof.

The following numbered clauses include embodiments that are contemplated and non-limiting:

Clause 1. An underbody camera adapted to be mounted to a vehicle to capture image data beneath the vehicle and around wheels of the vehicle, the underbody camera including a mounting bracket coupled to the vehicle.

Clause 2. The underbody camera of clause 1, any other clause, or any combination of clauses, further including a camera housing coupled to the mounting bracket and formed to include an interior camera compartment, the camera housing including an outer camera shell, a camera mount having an inner camera shell arranged to at least partially extend through a rear opening of the outer camera shell and an attachment plate configured to engage the outer camera shell and cover the rear opening, and a protective lens arranged to lie between a portion of the outer camera shell and the camera mount and to cover a front opening of the outer camera shell opposite the rear opening, and Clause 3. The underbody camera of clause 2, any other clause, or any combination of clauses, further including a camera coupled to the camera mount and arranged to lie within the interior camera compartment between the protective lens and attachment plate of the camera mount.

Clause 4. The underbody camera of clause 3, any other clause, or any combination of clauses, wherein the inner camera shell defines a camera-receiving pocket arranged within the interior camera compartment and the camera is arranged to lie within the camera-receiving pocket to provide dual-layer protection for the camera with the outer camera shell and the inner camera shell.

Clause 5. The underbody camera of clause 4, any other clause, or any combination of clauses, wherein the camera is fixed to the attachment plate by at least one fastener that extends through the attachment plate toward the protective lens.

Clause 6. The underbody camera of clause 4, any other clause, or any combination of clauses, wherein the camera includes a camera head that captures image data, a camera lens coupled to the camera head and configured to cooperate with the protective lens to focus the image data, and a camera-head gasket positioned between the attachment plate and the camera head.

Clause 7. The underbody camera of clause 3, any other clause, or any combination of clauses, wherein the inner camera shell includes an inner-shell body and a plurality of spacer ribs coupled to an outer surface of the inner-shell body and configured to engage an inside surface of the outer camera shell to position the camera relative to the protective lens.

Clause 8. The underbody camera of clause 7, any other clause, or any combination of clauses, wherein a distal end of the inner-shell body spaced apart from the attachment plate urges the protective lens toward the front opening formed in the outer camera shell.

Clause 9. The underbody camera of clause 8, any other clause, or any combination of clauses, wherein the camera housing further includes a first ring seal positioned between an annular rim of the outer camera shell defining the front opening and the protective lens, a protective lens gasket positioned between the protective lens and the distal tip of the inner-shell body, and a second ring seal positioned between a rear end of the outer camera shell and the attachment plate.

Clause 10. The underbody camera of clause 9, any other clause, or any combination of clauses, wherein the inner camera shell is attached to the outer camera shell by a plurality of fasteners that pull the attachment plate toward a rear end of the outer camera shell and the distal end of the inner-shell body toward the front protective lens.

Clause 11. The underbody camera of clause 3, any other clause, or any combination of clauses, wherein the mounting bracket includes a base, a first mount arm extending outwardly from the base and a second mount arm extending outwardly from the base, the first mount arm being spaced apart from the first mount such that the first mount arm is configured to engage a first lateral side of the camera housing and the second mount arm is configured to engage a second lateral side of the camera housing.

Clause 12. The underbody camera of clause 11, any other clause, or any combination of clauses, wherein the first mount arm and the second mount arm each include an arm extension coupled to the base and an arm head coupled to a distal end of the arm extension and spaced apart from the base, the arm head being formed to include at least one opening configured to receive a fastener to mount the camera housing to the mounting bracket.

Clause 13. The underbody camera of clause 12, any other clause, or any combination of clauses, wherein the at least one opening formed in the arm head is a curved slot and the fastener is moveable through the slot to adjust an orientation of the camera housing relative to the mounting bracket such that a viewing angle of the camera may be adjusted.

Clause 14. The underbody camera of clause 11, any other clause, or any combination of clauses, wherein the first mount arm and the second mount arm are each formed to include a pair of curved slots that are symmetrical to one another about a longitudinal axis of each corresponding mount arm, and wherein each curved slot is configured to receive a fastener to mount the camera housing to the mounting bracket and each fastener is moveable through the slot to adjust an orientation of the camera housing relative to the mounting bracket such that a viewing angle of the camera may be adjusted relative to the plurality of wheels.

Clause 15. The underbody camera of clause 3, any other clause, or any combination of clauses, wherein the underbody camera further comprises a lens-cleaning system including a spray nozzle mounted on the camera housing and arranged to direct a cleaning fluid toward an outer surface of the protective lens, and a cleaning-fluid conduit arranged to extend between a fluid supply and the spray nozzle to deliver the cleaning fluid to the spray nozzle.

Clause 16. The underbody camera of clause 15, any other clause, or any combination of clauses, wherein the outer camera shell includes an outer-shell body that at least partially defines the interior camera compartment, a pair of shell-mount foundations configured to engage the mounting bracket to secure the camera to the vehicle, and a nozzle shield coupled to the outer-shell body and arranged to lie in front of the spray nozzle to block debris from reaching the spray nozzle.

Clause 17. The underbody camera of clause 15, any other clause, or any combination of clauses, wherein the fluid-cleaning system further includes a second cleaning-fluid conduit configured to direct a second cleaning fluid different from the cleaning fluid provided by the fluid reservoir to the spray nozzle.

Clause 18. The underbody camera of clause 17, any other clause, or any combination of clauses, wherein the cleaning fluid from the fluid reservoir is a liquid and the second cleaning fluid is a gas.

Clause 19. The underbody camera of clause 15, any other clause, or any combination of clauses, wherein the spray nozzle is mounted to the camera housing for pivotable movement relative to the camera housing and the protective lens about a spray-nozzle pivot axis to adjust a spray location of the cleaning fluid onto the protective lens.

Clause 20. The underbody camera of clause 3, any other clause, or any combination of clauses, further comprising an actuator configured to pivot the camera housing and the camera relative to the mounting bracket such that the camera captures image data of a front and a rear of the vehicle.

Clause 21. The underbody camera of clause 3, any other clause, or any combination of clauses, further comprising an actuator configured to pivot the mounting bracket, the camera housing, and the camera about a vertical axis relative to the vehicle.

Clause 22. The underbody camera of clause 3, any other clause, or any combination of clauses, further comprising an actuator configured to move the camera housing and the camera from an extended position in which the camera is deployed to capture image data of areas under and around the vehicle, and a retracted position in which the camera housing and the camera are moved upwardly closer to the vehicle body.

The invention claimed is:

1. An underbody camera adapted to be mounted to a vehicle to capture image data beneath the vehicle and around wheels of the vehicle, the underbody camera comprising
  a mounting bracket coupled to the vehicle,
  a camera housing coupled to the mounting bracket and formed to include an interior camera compartment, the camera housing including an outer camera shell, a camera mount having an inner camera shell arranged to at least partially extend through a rear opening of the outer camera shell and an attachment plate configured to engage the outer camera shell and cover the rear opening, and a protective lens arranged to lie between a portion of the outer camera shell and the camera mount and to cover a front opening of the outer camera shell opposite the rear opening, and
  a camera coupled to the camera mount and arranged to lie within the interior camera compartment between the protective lens and attachment plate of the camera mount.

2. The underbody camera of claim 1, wherein the inner camera shell defines a camera-receiving pocket arranged within the interior camera compartment and the camera is arranged to lie within the camera-receiving pocket to provide dual-layer protection for the camera with the outer camera shell and the inner camera shell.

3. The underbody camera of claim 2, wherein the camera is fixed to the attachment plate by at least one fastener that extends through the attachment plate toward the protective lens.

4. The underbody camera of claim 2, wherein the camera includes a camera head that captures image data, a camera lens coupled to the camera head and configured to cooperate with the protective lens to focus the image data, and a camera-head gasket positioned between the attachment plate and the camera head.

5. The underbody camera of claim 1, wherein the inner camera shell includes an inner-shell body and a plurality of spacer ribs coupled to an outer surface of the inner-shell body and configured to engage an inside surface of the outer camera shell to position the camera relative to the protective lens.

6. The underbody camera of claim 5, wherein a distal end of the inner-shell body spaced apart from the attachment plate urges the protective lens toward the front opening formed in the outer camera shell.

7. The underbody camera of claim 6, wherein the camera housing further includes a first ring seal positioned between an annular rim of the outer camera shell defining the front opening and the protective lens, a protective lens gasket positioned between the protective lens and the distal tip of the inner-shell body, and a second ring seal positioned between a rear end of the outer camera shell and the attachment plate.

8. The underbody camera of claim 6, wherein the inner camera shell is attached to the outer camera shell by a plurality of fasteners that pull the attachment plate toward a rear end of the outer camera shell and the distal end of the inner-shell body toward the front protective lens.

9. The underbody camera of claim 1, wherein the mounting bracket includes a base, a first mount arm extending outwardly from the base and a second mount arm extending outwardly from the base, the first mount arm being spaced apart from the first mount such that the first mount arm is configured to engage a first lateral side of the camera housing and the second mount arm is configured to engage a second lateral side of the camera housing.

10. The underbody camera of claim 9, wherein the first mount arm and the second mount arm each include an arm extension coupled to the base and an arm head coupled to a distal end of the arm extension and spaced apart from the base, the arm head being formed to include at least one opening configured to receive a fastener to mount the camera housing to the mounting bracket.

11. The underbody camera of claim 10, wherein the at least one opening formed in the arm head is a curved slot and the fastener is moveable through the slot to adjust an orientation of the camera housing relative to the mounting bracket such that a viewing angle of the camera may be adjusted.

12. The underbody camera of claim 9, wherein the first mount arm and the second mount arm are each formed to include a pair of curved slots that are symmetrical to one another about a longitudinal axis of each corresponding mount arm, and wherein each curved slot is configured to receive a fastener to mount the camera housing to the mounting bracket and each fastener is moveable through the slot to adjust an orientation of the camera housing relative to the mounting bracket such that a viewing angle of the camera may be adjusted relative to the plurality of wheels.

13. The underbody camera of claim 1, wherein the underbody camera further comprises a lens-cleaning system including a spray nozzle mounted on the camera housing and arranged to direct a cleaning fluid toward an outer surface of the protective lens, and a cleaning-fluid conduit arranged to extend between a fluid supply and the spray nozzle to deliver the cleaning fluid to the spray nozzle.

14. The underbody camera of claim 13, wherein the outer camera shell includes an outer-shell body that at least partially defines the interior camera compartment, a pair of shell-mount foundations configured to engage the mounting bracket to secure the camera to the vehicle, and a nozzle shield coupled to the outer-shell body and arranged to lie in front of the spray nozzle to block debris from reaching the spray nozzle.

15. The underbody camera of claim 13, wherein the fluid-cleaning system further includes a second cleaning-fluid conduit configured to direct a second cleaning fluid different from the cleaning fluid provided by the fluid reservoir to the spray nozzle.

16. The underbody camera of claim 15, wherein the cleaning fluid from the fluid reservoir is a liquid and the second cleaning fluid is a gas.

17. The underbody camera of claim 13, wherein the spray nozzle is mounted to the camera housing for pivotable movement relative to the camera housing and the protective lens about a spray-nozzle pivot axis to adjust a spray location of the cleaning fluid onto the protective lens.

18. The underbody camera of claim 1, further comprising an actuator configured to pivot the camera housing and the camera relative to the mounting bracket such that the camera captures image data of a front and a rear of the vehicle.

19. The underbody camera of claim 1, further comprising an actuator configured to pivot the mounting bracket, the camera housing, and the camera about a vertical axis relative to the vehicle.

20. The underbody camera of claim 1, further comprising an actuator configured to move the camera housing and the camera from an extended position in which the camera is deployed to capture image data of areas under and around the vehicle, and a retracted position in which the camera housing and the camera are moved upwardly closer to the vehicle body.

* * * * *